US012789529B2

(12) United States Patent
Inui et al.

(10) Patent No.: US 12,789,529 B2
(45) Date of Patent: Nov. 10, 2026

(54) INKJET RECORDING APPARATUS

(71) Applicant: KYOCERA Document Solutions Inc., Osaka (JP)

(72) Inventors: Yasutaka Inui, Osaka (JP); Shunsuke Yamasaki, Osaka (JP); Shuhei Kawamata, Osaka (JP); Yuko Yano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 170 days.

(21) Appl. No.: 18/887,825

(22) Filed: Sep. 17, 2024

(65) Prior Publication Data

US 2025/0091352 A1 Mar. 20, 2025

(30) Foreign Application Priority Data

Sep. 19, 2023 (JP) ................................ 2023-150927

(51) Int. Cl.
*B41J 2/165* (2006.01)

(52) U.S. Cl.
CPC ....... *B41J 2/16552* (2013.01); *B41J 2/16508* (2013.01); *B41J 2002/16558* (2013.01)

(58) Field of Classification Search
CPC . B41J 2/16538; B41J 2/16535; B41J 2/16552
See application file for complete search history.

(56) References Cited

U.S. PATENT DOCUMENTS

| | | | |
|---|---|---|---|
| 10,259,225 B2 | 4/2019 | Araki et al. | |
| 2003/0081054 A1 | 5/2003 | Nakagawa et al. | |
| 2004/0130588 A1 * | 7/2004 | Nakagawa | B41J 2/16547 347/33 |
| 2018/0194141 A1 | 7/2018 | Araki et al. | |
| 2019/0016140 A1 * | 1/2019 | Furukawa | B41J 2/16538 |
| 2022/0097428 A1 * | 3/2022 | Amano | B41J 25/001 |

FOREIGN PATENT DOCUMENTS

| | | |
|---|---|---|
| JP | 2018-108711 A | 7/2018 |

* cited by examiner

*Primary Examiner* — Douglas X Rodriguez
*Assistant Examiner* — Rami A Alshoroogi
(74) *Attorney, Agent, or Firm* — Studebaker Brackett PLLC

(57) ABSTRACT

An inkjet includes a head unit, a blade, and a cleaning liquid supply member. The head unit is provided with a nozzle surface, and supported to be lifted and lowered. The blade is in contact with the nozzle surface and moves in a predetermined moving direction to wipe off the nozzle surface. The cleaning liquid supply member stores a cleaning liquid, and supplies the cleaning liquid between a moving start position of the blade and the nozzle surface. The cleaning liquid supply member has a plurality of supply ports provided between the moving start position of the blade and the nozzle surface. When a direction crossing to the moving direction is defined as a width direction, a width of the blade is set to "a", and a width of a region where the supply ports are formed is set to "b", then the next formula is established, a≤b.

3 Claims, 12 Drawing Sheets

INKJET RECORDING APPARATUS

INCORPORATION BY REFERENCE

This application is based on and claims the benefit of priority from Japanese patent application No. 2023-150927 filed on Sep. 19, 2023 which is incorporated by reference in its entirety.

BACKGROUND

The present disclosure relates to an inkjet recording apparatus including a blade which wipes a nozzle surface of a recording head with a cleaning liquid.

The inkjet recording apparatus is provided with a wipe unit which wipes a nozzle surface of a recording head by moving a blade along the nozzle surface. When the blade moves along the nozzle surface, the cleaning liquid is supplied between a moving start position of the blade and the nozzle surface. The blade moves along the nozzle surface while holding the supplied cleaning liquid.

The recording head of the inkjet recording apparatus may include a hollow storage part in which the cleaning liquid is stored, and a supply port which communicates with the storage part and through which the cleaning liquid is suppled between the moving start position of the blade and the nozzle surface. The cleaning liquid supplied from a cleaning liquid supply source to the storage part through the supply port is held in a state protruding downward from the supply port. After that, when the blade moves from the moving start position, the protruding cleaning liquid is wiped off by the blade and held by the blade, and then the nozzle surface is wiped off by the blade using the cleaning liquid, and ink or the like adhering to the nozzle surface is removed.

When the blade moves while holding the cleaning liquid as described above, if an amount of the cleaning liquid is insufficient, the cleaning performance becomes insufficient, resulting in thickening or sticking of the ink. Therefore, it is necessary to supply the cleaning liquid so as to spread over the nozzle surface.

SUMMARY

An inkjet recording apparatus according to the present disclosure includes a head unit, a blade, and a cleaning liquid supply member. The head unit is provided with a nozzle surface on which a plurality of ink ejection ports is opened downward, and supported to be lifted and lowered. The blade is in contact with the nozzle surface and moves in a predetermined moving direction to wipe off the nozzle surface. The cleaning liquid supply member stores a cleaning liquid replenished from a cleaning liquid source, and supplies the cleaning liquid between a moving start position of the blade and the nozzle surface. The cleaning liquid supply member has a plurality of supply ports provided between the moving start position of the blade and the nozzle surface. When a direction crossing to the moving direction is defined as a width direction, a width of the blade is set to “a”, and a width of a region where the supply ports are formed is set to “b”, then the next formula is established, $a \leq b$.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus according to one embodiment of the present disclosure will be described.

First, the entire configuration of the inkjet recording apparatus 1 will be described with reference to FIG. 1, FIG.

Figure 1:
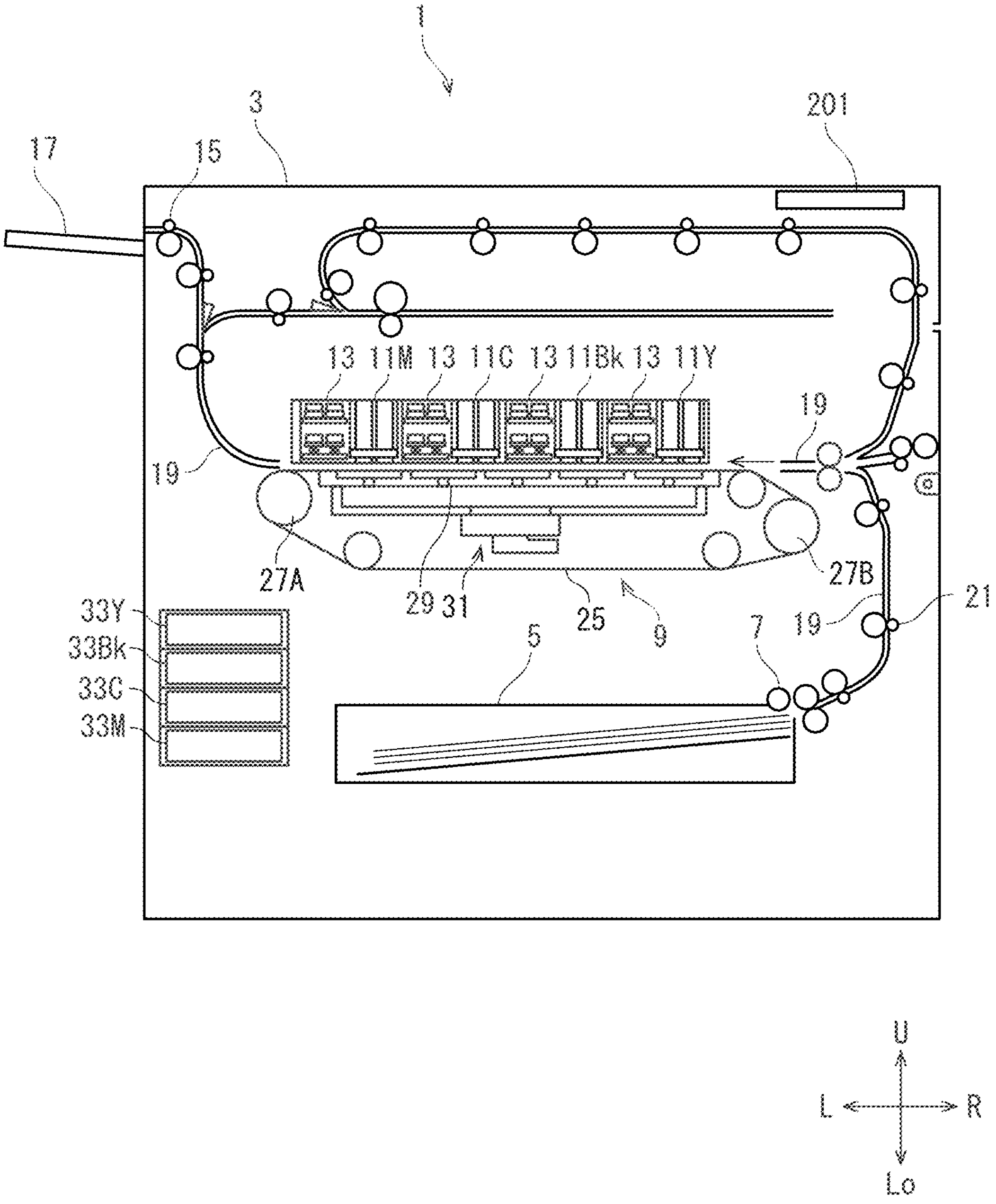
FIG. 1 is a front view schematically showing an inner structure of an inkjet recording apparatus according to one embodiment of the present disclosure.
Figure 2A:
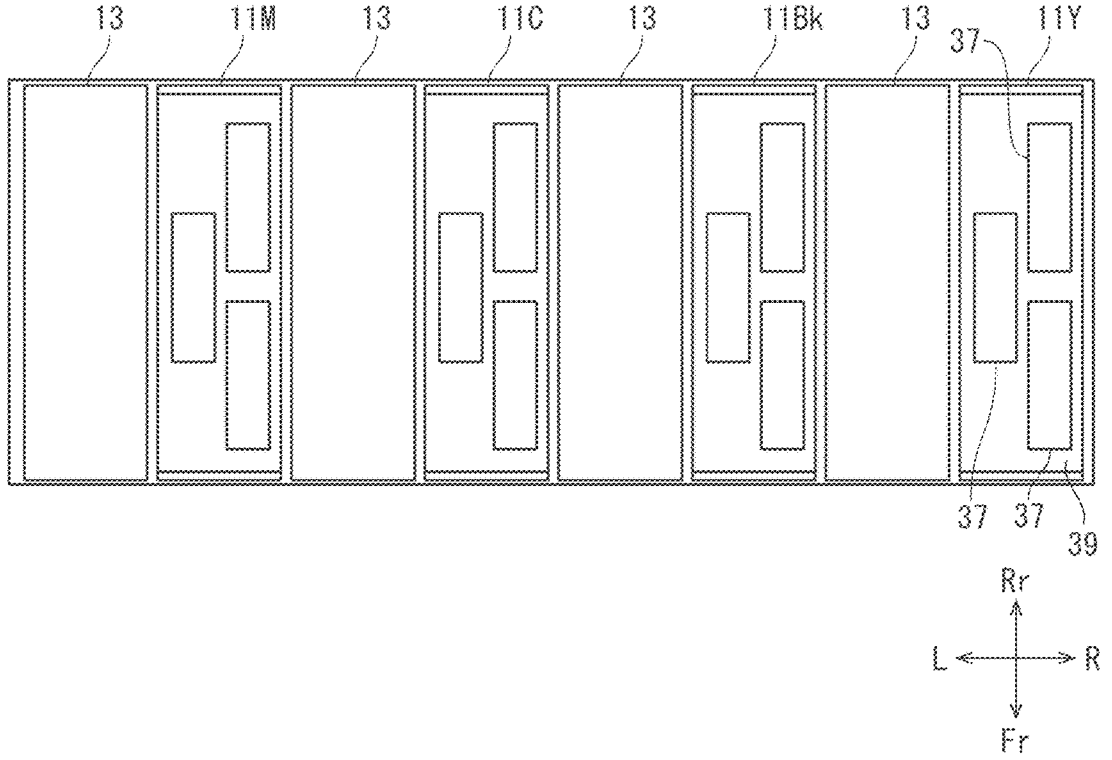
FIG. 2A is a plan view schematically showing head units and maintenance units of the inkjet recording apparatus according to the embodiment of the present disclosure.
Figure 2B:
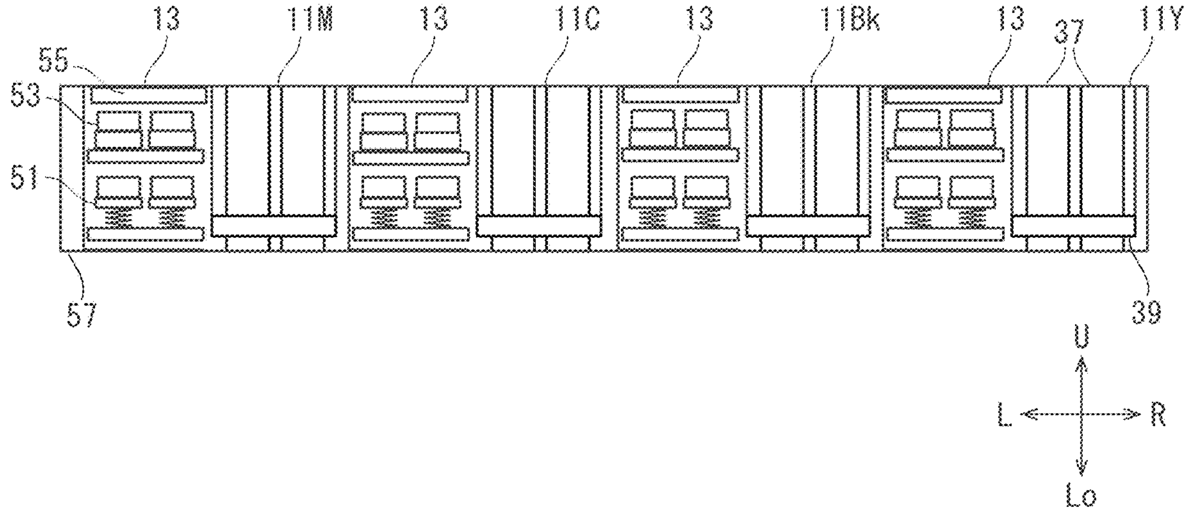
FIG. 2B is a front view schematically showing the head units and the maintenance units of the inkjet recording apparatus according to the embodiment of the present disclosure.

2A, and FIG. 2B. FIG. 1 is a front view schematically showing the inside of the inkjet recording apparatus 1. FIG. 2A is a plan view schematically showing head units 11 and maintenance units 13, and FIG. 2B is a side view schematically showing the head units 11 and the maintenance units 13. Hereinafter, the front side of the paper plane on which FIG. 1 is drawn is defined as the front side of the inkjet recording apparatus 1. In each figure, U, Lo, L, R, Fr, and Rr indicate the upper, lower, left, right, front, and rear, respectively.

As shown in FIG. 1, the inkjet recording apparatus 1 is an inkjet image forming apparatus that forms an image by ejecting ink. The inkjet recording apparatus 1 includes a rectangular parallelepiped body housing 3. In the lower portion of the inside of the body housing 3, a sheet feeding cassette 5 which stores a sheet, such as a plain paper and a coated paper, and a sheet feeding roller 7 which feeds the sheet from the sheet feeding cassette 5 are provided. Above the sheet feeding cassette 5, a conveying unit 9 which conveying the sheet is provided. Above the conveying unit 9, four head units 11M, 11C, 11Bk, and 11Y (collectively referred to as a head unit 11) and four maintenance units 13 are provided (see also FIG. 2A and FIG. 2B). In the left and upper portion of the body housing 3, a discharge rollers pair 15 which discharges the sheet on which an image is formed and a discharge tray 17 on which the discharged sheet is stacked are provided.

Inside the body housing 3, a conveyance path 19 from the sheet feeding cassette 5 through the conveying unit 9 to the discharge rollers pair 15 is provided. On the conveyance path 19, a plurality of conveying rollers pairs 21 for conveying the sheet is provided.

Next, the conveying unit 9 will be described with reference to FIG. 1. The conveying unit 9 includes an endless conveying belt 25. The conveying belt 25 has a number of through-holes penetrating in the thickness direction. The conveying belt 25 is wound around a driving roller 27A and a driven roller 27B arranged at an interval in the left-and-right direction. The driving roller 27A is driven by a motor (not shown) to be rotated. As the driving roller 27A is rotated, the conveying belt 25 travels in the counterclockwise direction of FIG. 1. The conveying belt 25 traveling along an upper track forms the conveyance path 19 along which the sheet is conveyed in a conveyance direction from the right to the left in FIG. 1.

In the inner hollow space of the conveying belt 25, a conveying plate 29 and a suction device 31 are provided. The conveying plate 29 has a number of through-holes penetrating in the thickness direction. The conveying plate 29 is in contact with the inner surface of the conveying belt 25 traveling along the upper track. The suction device 31 is provided below the conveying plate 29, and attracts the sheet to the conveying belt 25 by sucking air through the through-holes of the conveying belt 25 and the through-holes of the conveying plate 29.

Next, the head unit 11 will be described. The four head units 11Y, 11Bk, 11C, and 11M correspond to yellow, black, cyan, and magenta inks, respectively, and are arranged above the conveying unit 9 at predetermined intervals along the conveyance direction. Ink containers 33Y, 33Bk, 33C, and 33M filled with the yellow, black, cyan, and magenta ink, respectively, are connected to the four head units 11. As shown in FIG. 2A and FIG. 2B, the head unit 11 includes three recording heads 37 and a plate 39 for supporting the three recording heads 37.

Figure 3A:
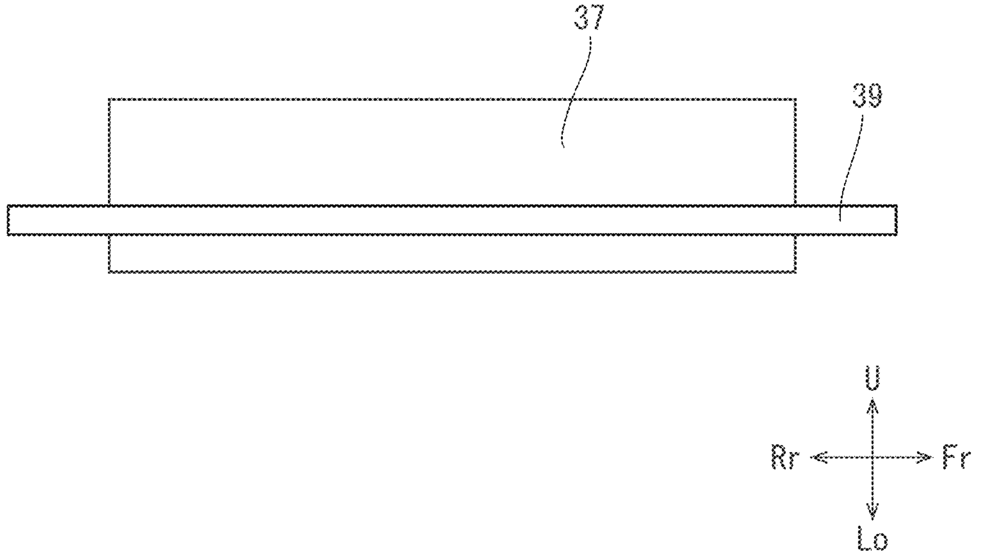
FIG. 3A is a side view showing a recording head of the inkjet recording apparatus according to the embodiment of the present disclosure.
Figure 3B:
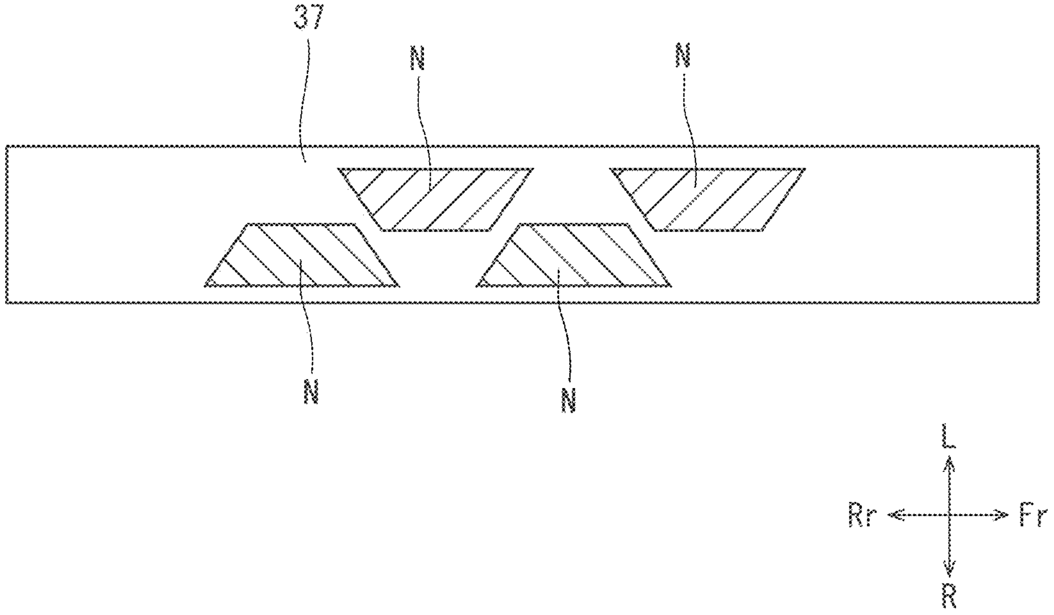
FIG. 3B is a bottom view showing the recording head of the inkjet recording apparatus according to the embodiment of the present disclosure.

The recording head 37 will be described with reference to FIG. 3A and FIG. 3B. FIG. 3A is a side view showing the recording head 37, and FIG. 3B is a bottom view showing the recording head 37. The recording head 37 has a rectangular parallelepiped shape elongated in a width direction (the front-and-rear direction) intersecting the sheet conveyance direction. The recording head 37 includes a number of nozzles (not shown) to which the ink is supplied, and a piezoelectric element (not shown) provided for each nozzle. The ejection ports of the nozzles are opened on the lower surface of the recording head 37. When the piezoelectric element is driven, the ink in the nozzle is ejected downward through the ejection port. As shown in FIG. 3B, the surface including the region N where the ejection ports are opened is defined as a nozzle surface N.

As shown in FIG. 2A, the three recording heads 37 are arranged in a staggered pattern along the width direction (the front-and-rear direction). Specifically, the two recording heads 37 are arranged side by side in the width direction, and one recording head 37 is arranged adjacent to the two recording heads 37 in the conveyance direction. The recording head 37 is supported such that the lower end portion protrudes from the plate 39 as shown in FIG. 3A.

Each of the four head units 11 is supported by a head unit lifting mechanism 41 (not shown in FIG. 1, FIG. 2A and FIG. 2B, see FIG. 11) so as to be lifted and lowered between a printing position and a retracted position. The printing position is a position where the nozzle surface N of the recording head 37 of the head unit 11 faces the conveying belt 25 traveling along the upper track with a predetermined interval (for example, 1 mm) (see FIG. 1). The retracted position is a position where the nozzle surface N of the recording head 37 of the head unit 11 is separated from the conveying belt 25 higher than the printing position to form a space above the conveying unit 9 in order to accommodate a cap unit 51 and a wipe unit 53 of the maintenance unit 13 described later. The head unit lifting mechanism 41 is electrically connected to the control part 201 (see FIG. 11).

Next, the maintenance unit 13 will be described. The four maintenance units 13 have the same structure, and are provided for the respective four head units 11. The maintenance unit 13 is disposed adjacent to the corresponding head unit 11 in the conveyance direction. In this embodiment, the maintenance unit 13 is disposed on a downstream side (the left side) of the corresponding head unit 11.

As shown in FIG. 2B, the maintenance unit 13 includes the cap unit 51 that covers the nozzle surfaces N of the three recording heads 37 of the head unit 11, a wipe unit 53 that cleans the nozzle surfaces N of the three recording heads 37 of the head unit 11, and a cleaning liquid replenishment part 55 that supplies a cleaning liquid to the wipe unit 53.

The cap unit 51, the wipe unit 53, and the cleaning liquid replenishment part 55 are supported by a housing 57. The housing 57 has a hollow rectangular parallelepiped shape elongated in the width direction, and a surface (the right surface) facing the corresponding head unit 11 is opened.

Figure 4:
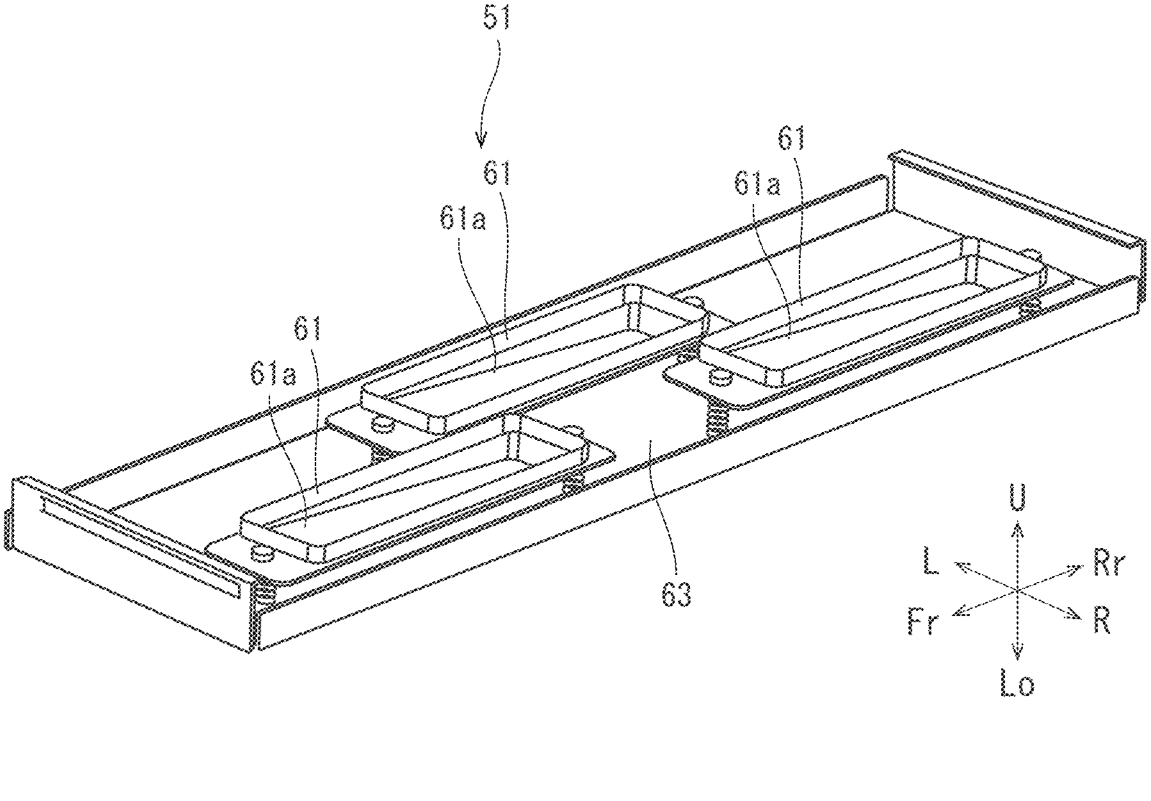
FIG. 4 is a perspective view showing a cap unit of the inkjet recording apparatus according to the embodiment of the present disclosure.

First, the cap unit 51 will be described with reference to FIG. 4. FIG. 4 is a perspective view showing the cap unit 51. The cap unit 51 includes three caps 61 covering the nozzle surfaces N of the three recording heads 37. The three caps 61 are arranged in a staggered pattern along the width direction to correspond to the three recording heads 37 of the head unit 11, and are supported by a support plate 63. The cap 61 has a recess 61*a* having an open upper surface, and a discharge port (not shown) provided at the bottom of the recess 61*a*.

The cap unit 51 can be moved between a standby position (see FIG. 1, FIG. 2A, and FIG. 2B) and a capping position in the conveyance direction and in the opposite direction (the left-and-right direction) by a cap unit moving mechanism (not shown). The standby position is a position where the cap unit 51 is accommodated in the lower space of the housing 57. The capping position is a position where the cap unit 51 is accommodated in the space below the head unit 11 lifted to the retracted position. By moving the cap unit 51 to the capping position and lowering the head unit 11 to a predetermined height, the nozzle surfaces N of the three recording heads 37 are covered with the three caps 61. The cap unit 51 is movable between the capping position and the standby position through the right opened surface of the housing 57.

Figure 5:
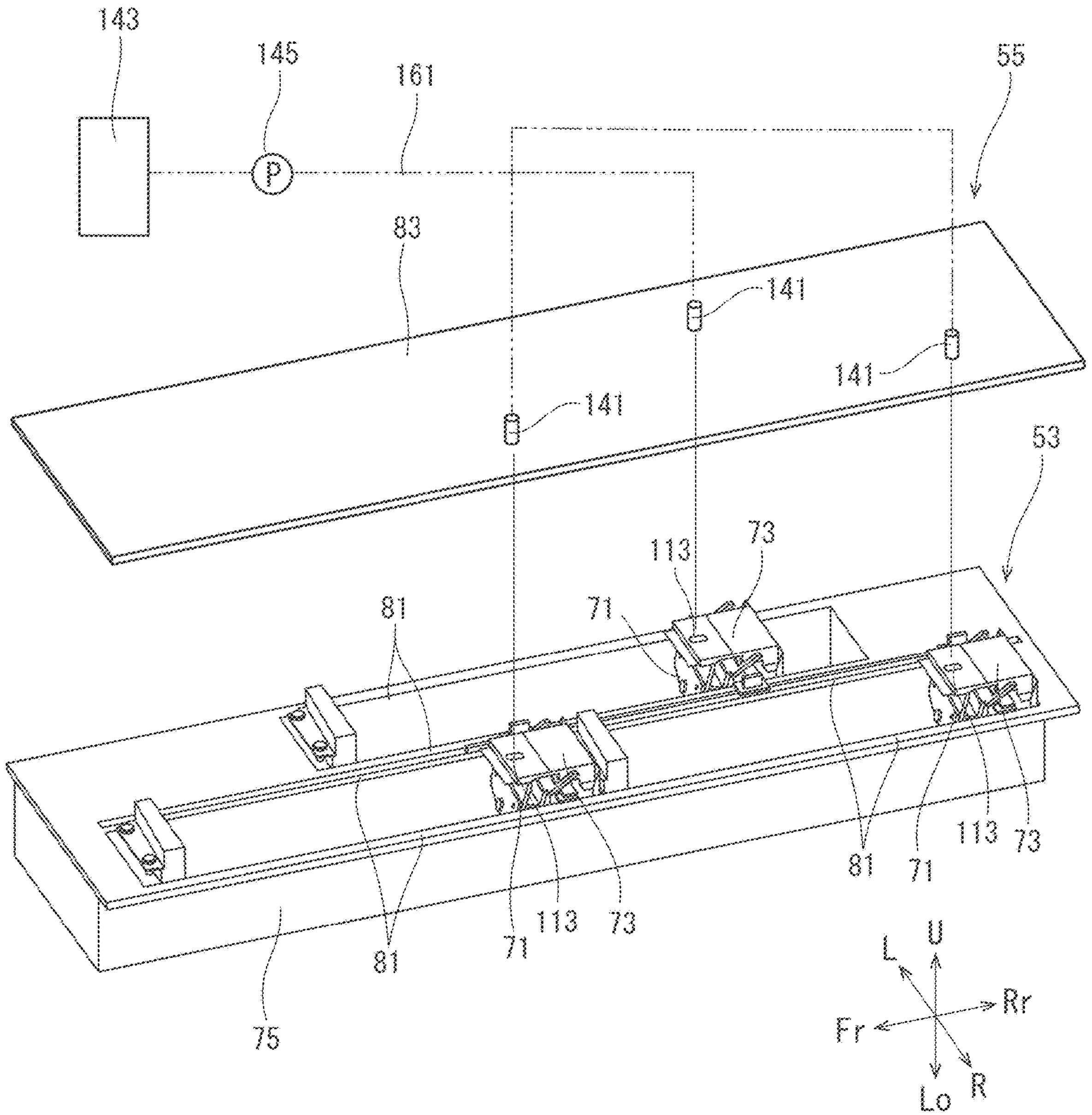
FIG. 5 is a perspective view showing a wipe unit and a cleaning liquid supply part in the inkjet recording apparatus according to the embodiment of the present disclosure.

Next, the wipe unit 53 will be described with reference to FIG. 5. FIG. 5 is a perspective view showing the wipe unit 53 and the cleaning liquid replenishment part 55. The wipe unit 53 includes three carriages 71, three cleaning liquid supply members 73, and a waste liquid tray 75 by which the three carriages 71 and the three cleaning liquid supply members 73 are supported.

First, the waste liquid tray 75 will be described. The waste liquid tray 75 is a box-like member with an open upper surface, and has a dimension corresponding to the head unit 11. The waste liquid tray 75 is provided with three rails 81 along the width direction (the front-and-rear direction). The three rails 81 are arranged to correspond to the three recording heads 37 of the head unit 11.

The upper surface of the waste liquid tray 75 is opened and closed by a waste liquid tray cover 83. The waste liquid tray cover 83 is supported by the housing 57 with a waste liquid tray cover lifting mechanism 85 (not shown in FIG. 5, see FIG. 11) so as to be lifted and lowered. The waste liquid tray cover 83 is lifted and lowered by the waste liquid tray cover lifting mechanism 85 to a height covering the upper surface of the waste liquid tray 75 and a height separated upward from the upper surface of the waste liquid tray 75. The waste liquid tray cover lifting mechanism 85 is electrically connected to the control part 201 (see FIG. 11). The waste liquid tray cover 83 will be described later.

Figure 6:
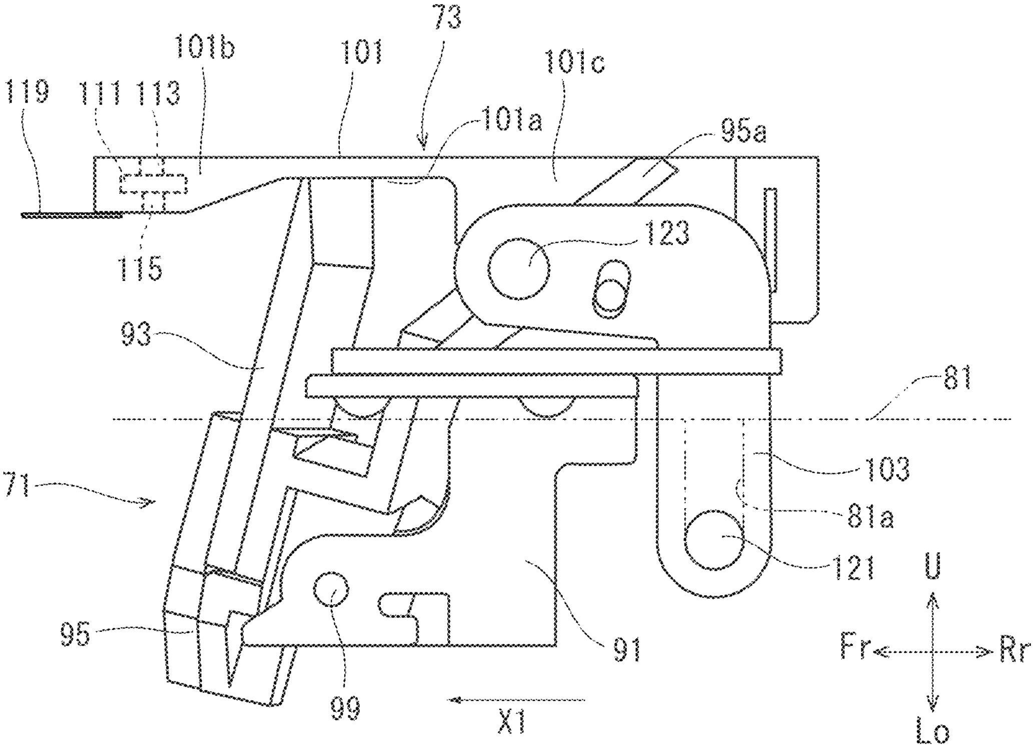
FIG. 6 is a side view showing a carriage and a cleaning liquid supply member of the wipe unit in the inkjet recording apparatus according to the embodiment of the present disclosure.
Figure 7:
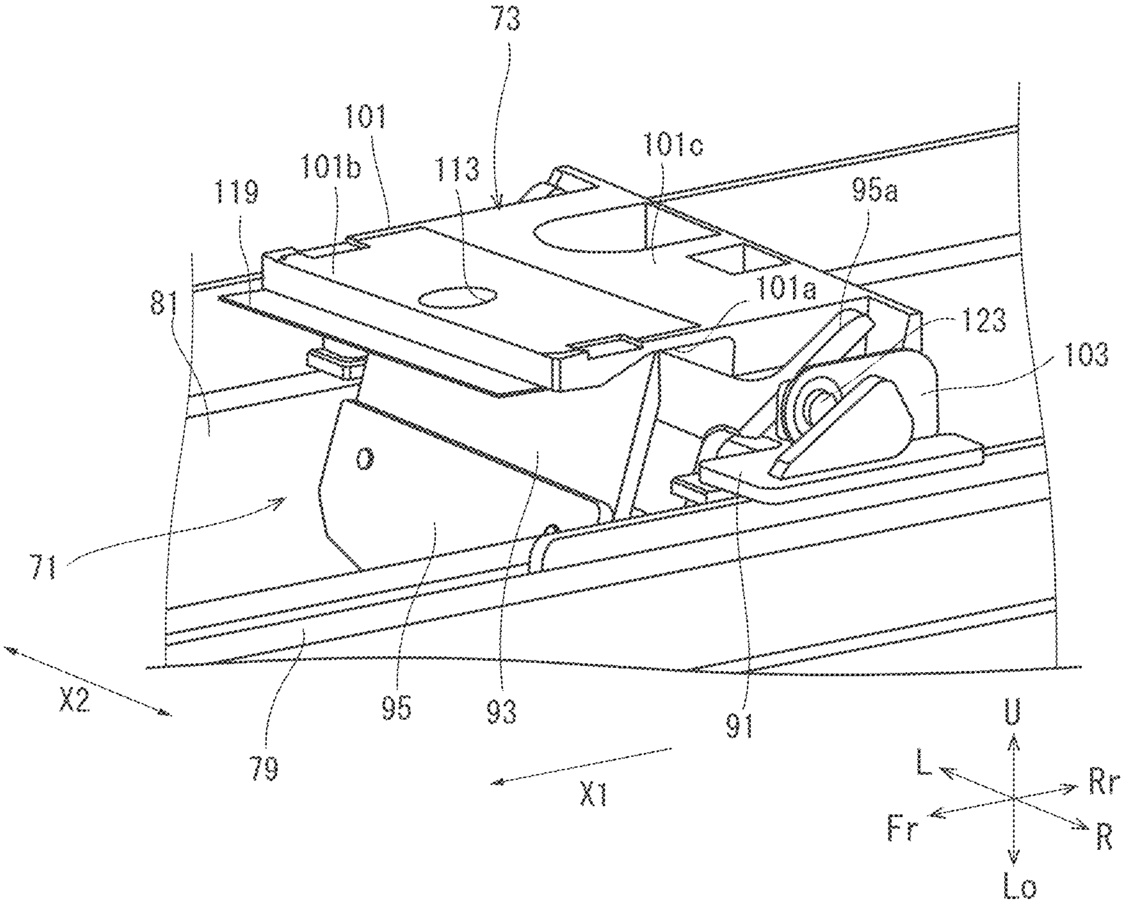
FIG. 7 is a perspective view showing the carriage and the cleaning liquid supply member of the wipe unit in the inkjet recording apparatus according to the embodiment of the present disclosure.
Figure 8:
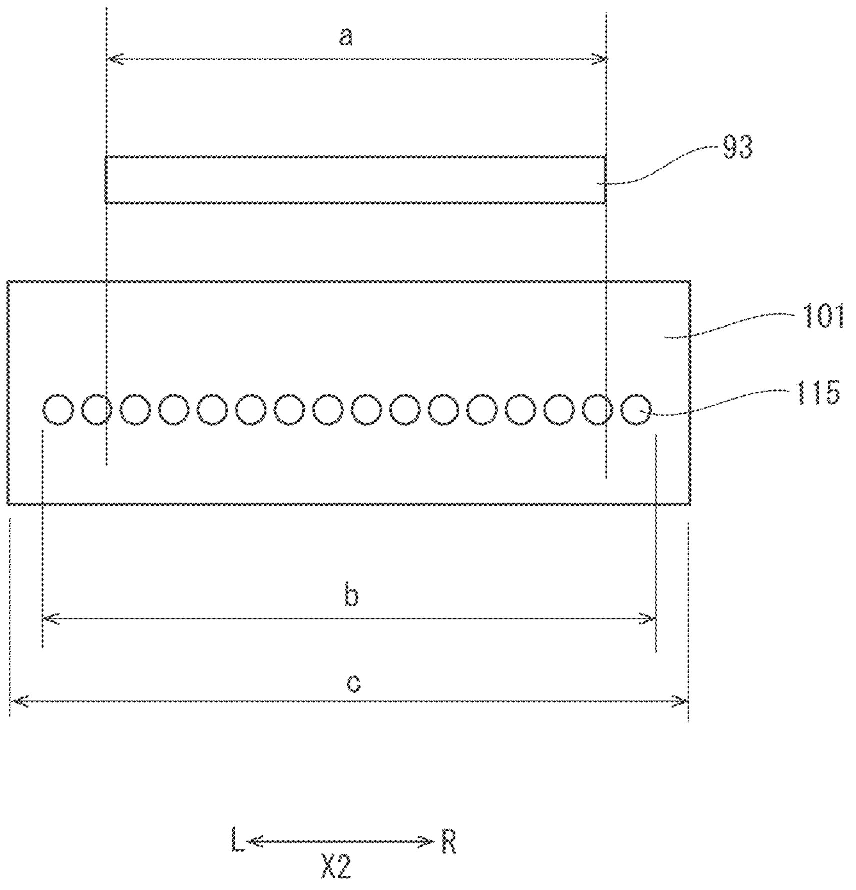
FIG. 8 is a bottom view showing a blade, a cleaning liquid storage member and a supply port, in the inkjet recording apparatus according to the embodiment of the present disclosure.

Next, the carriage 71 and the cleaning liquid supply member 73 will be described with reference to FIG. 6, FIG. 7 and FIG. 8. FIG. 6 is a side view showing the carriage 71 and the cleaning liquid supply member 73, FIG. 7 is a perspective view showing the carriage 71 and the cleaning liquid supply member 73, and FIG. 8 is a bottom view showing a cleaning liquid storage member 101.

First, the carriage 71 will be described with reference to FIG. 6. The carriage 71 includes a moving body 91, a blade 93, and a holder 95 which supports the blade 93 and is supported by the moving body 91.

Figure 11:
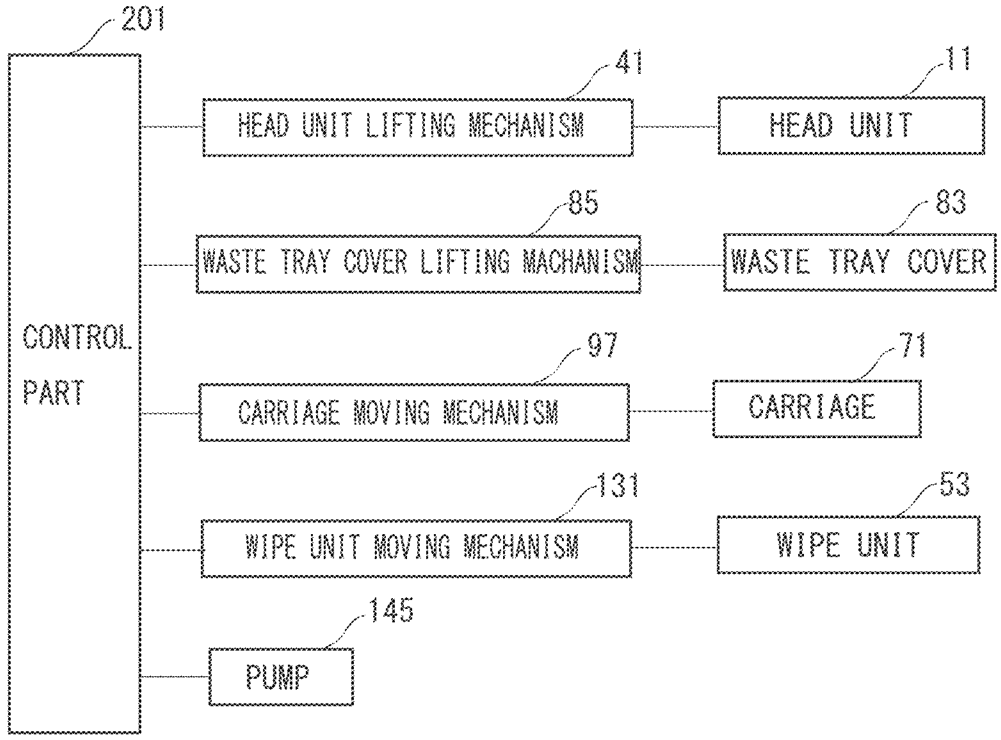
FIG. 11 is a block diagram showing a control part of the inkjet recording apparatus according to the embodiment of the present disclosure.

The moving body 91 is engaged with the rail 81 provided in the waste liquid tray 75, and can be moved between the rear end portion and the front end portion of the rail 81 by a carriage moving mechanism 97 (not shown in FIG. 6, see FIG. 11). In this example, when cleaning the nozzle surface N of the recording head 37, the moving body 91 moves from the rear end portion (a moving start position) to the front end portion (a moving end position) of the rail 81. The direction from the moving start position to the moving end position (in this example, the direction from the rear to the front) is defined as a moving direction X1 of the moving body 91 (the carriage 71). The carriage moving mechanism 97 is electrically connected to the control part 201 (see FIG. 11).

The blade 93 is a plate-like member having a width wider than the width of the nozzle face N, and is made of flexible resin or the like. The lower end portion of the blade 93 is supported by the holder 95 in a posture inclined upstream in the moving direction X1 and inclined in the blade width direction X2 (the left-and-right direction) intersecting the moving direction X1. The lower end portion of the holder 95 is rotatably supported on the moving body 91 around a turning shaft 99 on the upstream side of the blade 93 in the moving direction X1. Thereby, the blade 93 can be turned to the upstream side and the downstream side of the moving direction X1 together with the holder 95 around the turning shaft 99. The holder 95 has a pair of arms 95*a* extending upward from both sides in the blade width direction X2.

Next, the cleaning liquid supply member 73 will be described with reference to FIG. 6, FIG. 7 and FIG. 8. The cleaning liquid supply member 73 is provided separately from the carriage 71, and includes a cleaning liquid storage member 101 and a pair of holders 103 which supports the cleaning liquid storage member 101 and is supported by the rail 81.

First, the cleaning liquid storage member 101 will be described. The cleaning liquid storage member 101 is a rectangular plate-like member, and has a flat upper surface. As shown in FIG. 6, a recess 101*a* is formed on the lower surface of the cleaning liquid storage member 101 along the blade width direction X2. The downstream side surface of the recess 101*a* in the moving direction X1 is inclined toward the downstream side of the moving direction X1. The cleaning liquid storage member 101 has a front end portion 101*b* on the downstream side of the recess 101*a* in the moving direction X1 and a base end portion 101*c* on the upstream side of the recess 101*a*. The front end portion 101*b* is formed to be thinner than the base end portion 101*c*. The lower surface of the front end portion 101*b* is formed in a planar shape inclined slightly upward toward the downstream side of the moving direction X1.

The front end portion 101*b* has a hollow portion 111 for storing the cleaning liquid. The hollow portion 111 is formed in a rectangular parallelepiped shape long in the blade width direction X2 and short in the moving direction X1 in a plan view. As shown in FIG. 6 and FIG. 7, a replenishment port 113 penetrates between the top surface of the hollow portion 111 and the upper surface of the front end portion 101*b*. The replenishment port 113 is arranged at the center in the blade width direction X2.

As shown in FIG. 6, a plurality of supply ports 115 penetrate between the bottom surface of the hollow portion 111 and the lower surface of the front end portion 101*b*. As shown in FIG. 8, the supply ports 115 are arranged along the blade width direction X2. Here, when a width of the blade 93 is set to "a", a width of the region where the supply ports 115 are formed is set to "b", and a width of the front end portion 101*b* is set to "c", $a \leq b < c$. That is, the width of the blade 93 is equal to or narrower than the width of the region where the supply ports 115 are formed, and the width of the region where the supply ports 115 are formed is narrower than the width of the front end portion 101*b*. The width of the blade 93 is wider than the width of the nozzle surface N of the recording head 37.

Further, the outermost supply ports 115 of the supply ports 115 are arranged outside the both ends of the blade 93. A part of the supply port 115 may be disposed outside the both ends of the blade 93.

As shown in FIG. 6 and FIG. 7, a rectangular sheet 119 protruding downstream in the moving direction X1 is attached on the lower surface of the front end portion 101*b*. The sheet 119 extends downstream (forward) in the moving direction X1 along the substantially same surface as the lower surface of the front end portion 101*b*. The sheet 119 is attached on the downstream side of the supply ports 115 in the moving direction X1.

Next, the pair of holders 103 will be described. Each of the holders 103 is an L-shaped plate-like member viewed from the side surface. A support shaft 121 is provided at one end of the holder 103. As shown in FIG. 6, the support shaft 121 is housed in a notch 81*a* provided on the rail 81 on the upstream side of the moving start position of the carriage 71 in the moving direction X1. On the other end of the holder 103, the base end portion 101*c* of the cleaning liquid storage member 101 is rotatably supported around a turning shaft 123.

Figure 9A:
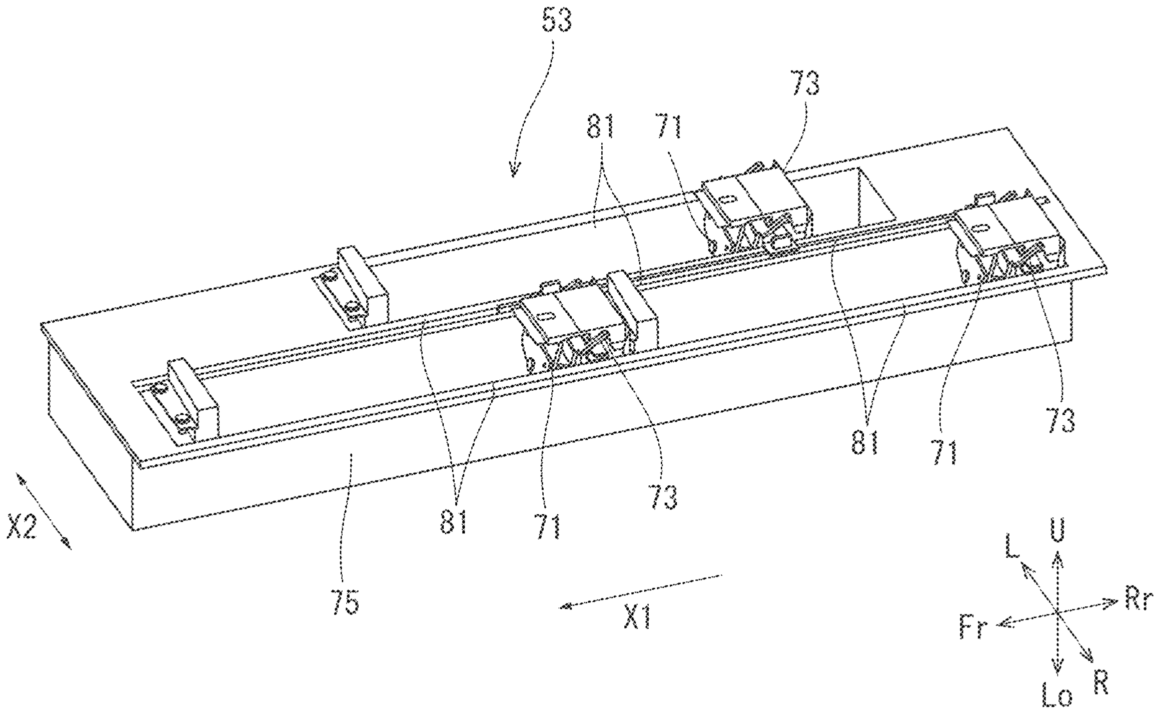
FIG. 9A is a perspective view showing the carriage moved to a moving start position, in the wipe unit of the inkjet recording apparatus according to the embodiment of the present disclosure.
Figure 9B:
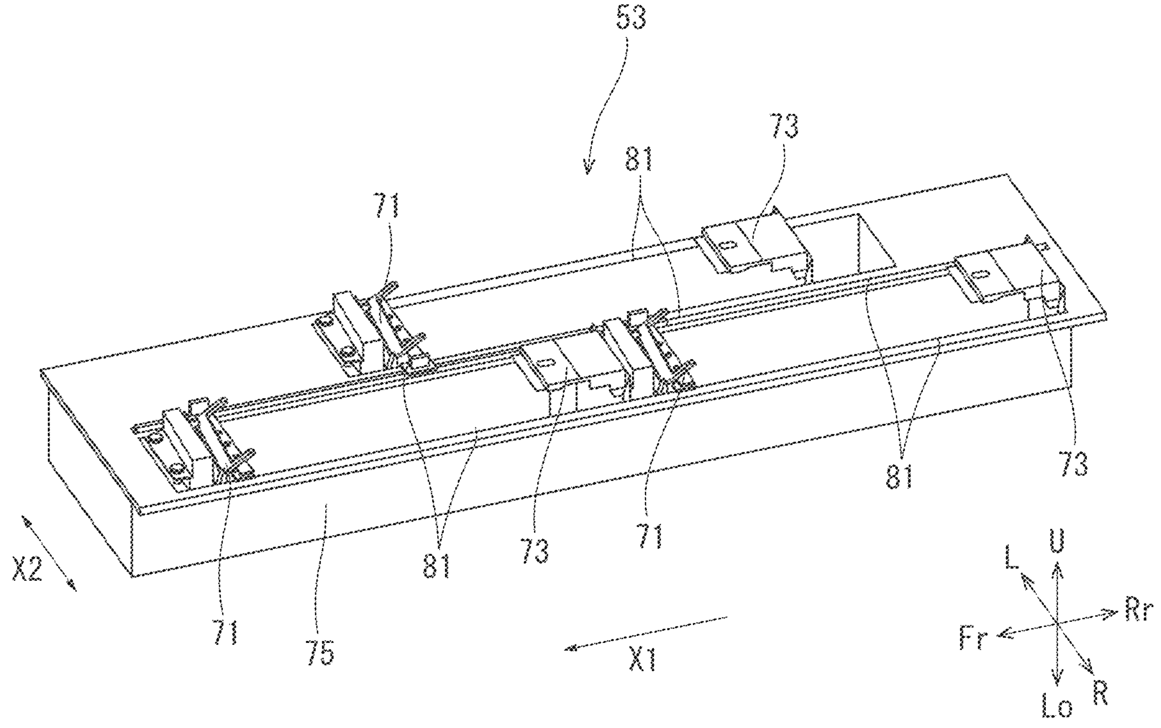
FIG. 9B is a perspective view showing the carriage moved to a moving end position, in the wipe unit of the inkjet recording apparatus according to the embodiment of the present disclosure.

Next, the movement of the carriage 71 will be described with reference to FIG. 9A and FIG. 9B. FIG. 9A shows the carriage 71 moved to the moving start position, and FIG. 9B shows the carriage 71 moved to the moving end position.

When the carriage 71 is moved to the moving start position (see FIG. 9A), the tip end of the blade 93 is accommodated in the recess 101*a* of the cleaning liquid storage member 101 (see FIG. 6). The carriage 71 is moved from the moving start position (see FIG. 9A) to the moving end position (see FIG. 9B) by the carriage moving mechanism 97 (see FIG. 11). Since the cleaning liquid supply member 73 is immovably supported on the rail 81 of the waste liquid tray 75 as described above, the cleaning liquid supply member 73 does not move even if the carriage 71 is moved.

Next, the movement of the wipe unit 53 will be described. The wipe unit 53 (the carriage 71, the cleaning liquid supply member 73, and the waste liquid tray 75) can be moved between a standby position (see FIG. 2B) and a wiping position by the wipe unit moving mechanism 131 (see FIG. 11) in the conveyance direction and the opposite direction (the left-and-right direction). The standby position is a position where the wipe unit 53 is accommodated in the upper space of the housing 57. The wipe position is a position where the wipe unit 53 is accommodated in the space below the head unit 11 lifted to the retracted position. After the head unit 11 is lifted to the retracted position, the wipe unit 53 is moved to the wipe position, and the head unit 11 is lowered to a predetermined height so that the blade 93 can be in contact with the nozzle surface N of the recording head 37. The wipe unit 53 is movable between the standby position and the wipe position through the right opened surface of the housing 57. The wipe unit moving mechanism 131 is electrically connected to the control part 201 (see FIG. 11).

In addition, when the wipe unit 53 is moved to the standby position and the wiping position in this manner, the cleaning liquid supply member 73 included in the wipe unit 53 is moved to a replenishment position where the cleaning liquid is supplied from the cleaning liquid replenishment part 55 and a supply position where the replenished cleaning liquid can be supplied to the nozzle surface N of the recording head 37.

Figure 10:
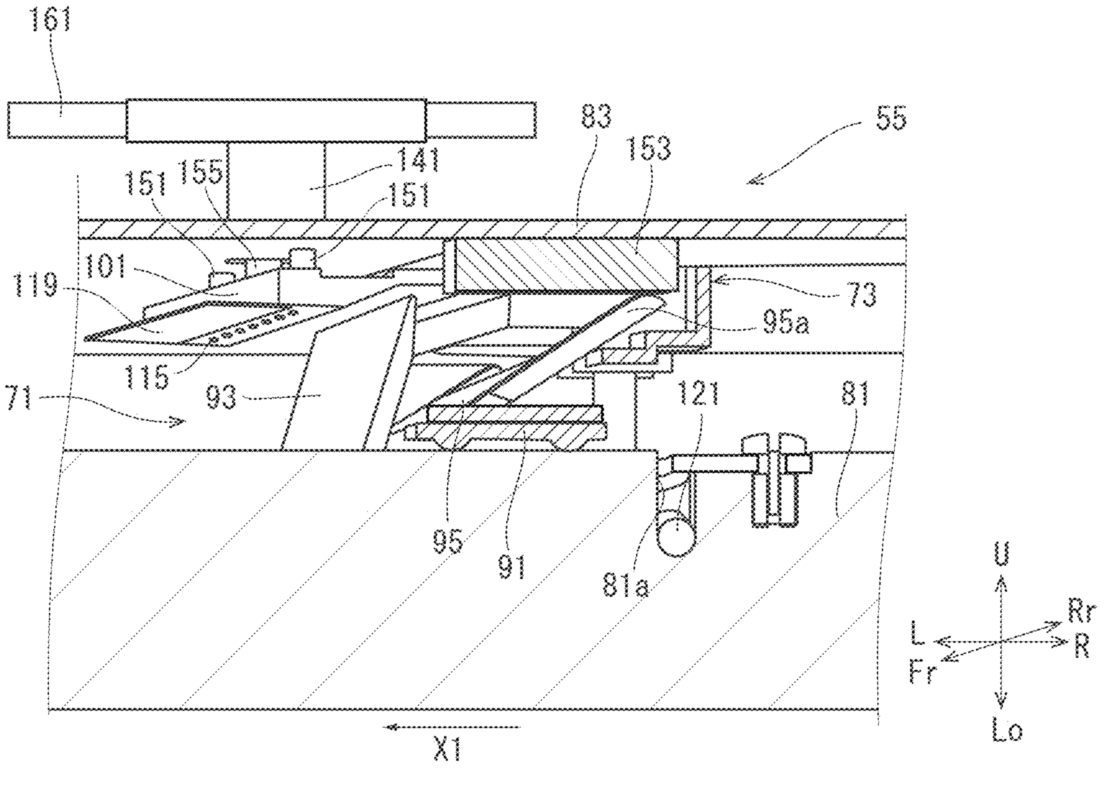
FIG. 10 is a perspective view showing the carriage and the cleaning liquid supply member when the cleaning liquid is replenished, in the wipe unit of the inkjet recording apparatus according to the embodiment of the present disclosure.

Next, the cleaning liquid replenishment part 55 will be described with reference to FIG. 5 and FIG. 10. FIG. 10 is a perspective view showing the carriage 71 and the cleaning liquid supply member 73 when the cleaning liquid is replenished.

The cleaning liquid replenishment part 55 is provided in the housing 57 (see FIG. 2B), and supplies the cleaning liquid to the three cleaning liquid supply members 73 of the wipe unit 53. As shown in FIG. 5, the cleaning liquid replenishment part 55 includes three replenishment pipes 141, a cleaning liquid tank 143, and a pump 145.

As shown in FIG. 5, the three replenishment pipes 141 are supported by the waste liquid tray cover 83. The three replenishment pipes 141 are arranged so as to correspond to the replenishment ports 113 of the cleaning liquid storage members 101 of the three cleaning liquid supply members 73 of the wipe unit 53 moved to the standby position. When the waste liquid tray cover 83 is lifted and lowered by the waste liquid tray cover lifting mechanism 85 (see FIG. 11), the three replenishment pipes 141 are also lifted and lowered together with the waste liquid tray cover 83. When the waste liquid tray cover 83 is lowered, the replenishment pipes 141 are moved just above the replenishment ports 113. At this time, the tip of the replenishment pipe 141 may be inserted into the corresponding replenishment port 113.

As shown in FIG. 10, on the lower surface of the waste liquid tray cover 83, a pair of positioning pins 151 are formed on both sides of the replenishment pipe 141 in the blade width direction X2. Further, on the lower surface of the waste liquid tray cover 83, a pair of rectangular parallelepiped protrusions 153 separated from each other in the blade width direction X2 are formed on the upstream side of each replenishment pipe 141 in the moving direction X1.

With reference to FIG. 5 again, the cleaning liquid tank 143 will be described. The cleaning liquid is stored in the cleaning liquid tank 143. The cleaning liquid is, for example, a liquid consisting mainly of a solvent and water, in which the color material is removed from the ink. Surfactant, preservative or the like may be added as necessary. A pipe 161 is connected to the outlet port of the cleaning liquid tank 143. The three replenishment pipes 141 are connected in the middle of the pipe 161. The cleaning liquid tank 143 is an example of the cleaning liquid supply source in the present disclosure.

Next, the pump 145 will be described. The pump 145 is provided on the pipe 161, and pumps the cleaning liquid from the cleaning liquid tank 143 to the pipe 161.

Next, the control part 201 will be described with reference to the block diagram of FIG. 11. The control part 201 operates the head unit lifting mechanism 41 to lift and lower the head unit 11 to a plurality of positions including the printing position, the retracted position, and a cleaning position between the printing position and the retracted position. The control part 201 operates the waste liquid tray cover lifting mechanism 85 to lift and lower the waste liquid tray cover 83 to the separated position and the insertion position. The control part 201 operates the carriage moving mechanism 97 to move the carriage 71 between the moving start position and the moving end position. The control part 201 operates the wipe unit moving mechanism 131 to move the wipe unit 53 between the wiping position and the separated position. Further, the control part 201 operates the pump 145 to start and stop pumping of the cleaning liquid from the cleaning liquid tank 143 to the pipe 161.

Figure 12A:
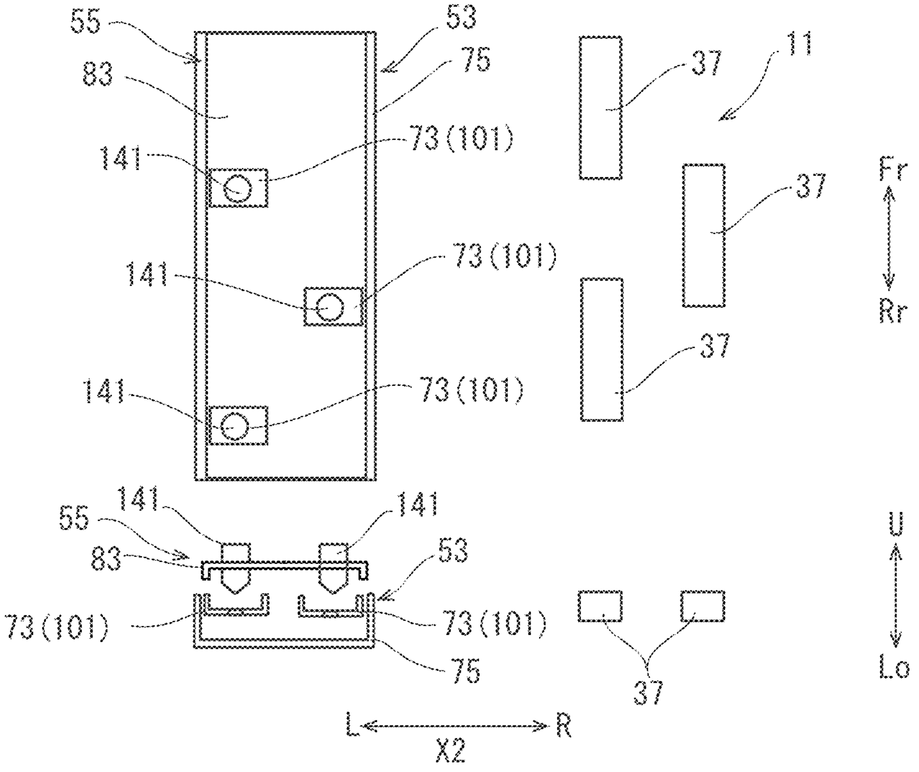
FIG. 12A is a plan view showing the wipe unit moved to a separated position, a cleaning liquid replenishment part and the recording head, in the inkjet recording apparatus according to the embodiment of the present disclosure.
Figure 12B:
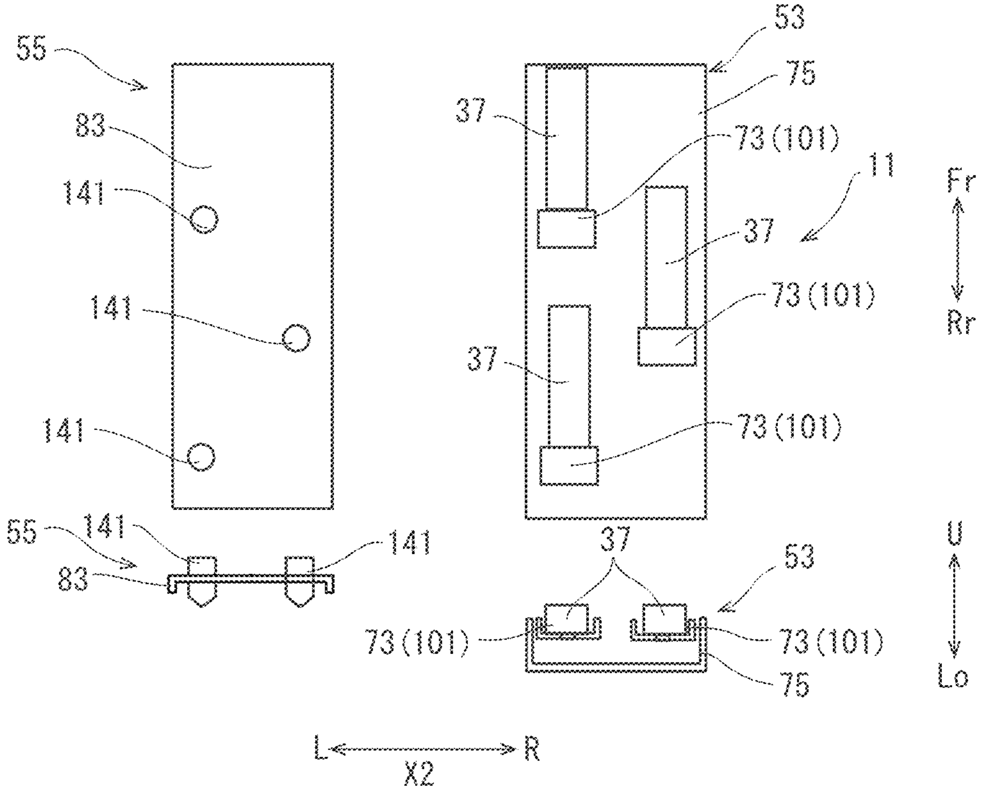
FIG. 12B is a plan view showing the wipe unit moved to a wiping position, the cleaning liquid replenishment part and the recording head, in the inkjet recording apparatus according to the embodiment of the present disclosure.

Next, the printing operation and the head cleaning operation of the inkjet recording apparatus 1 having the above configuration will be described with reference to FIG. 12A and FIG. 12B. FIG. 12A and FIG. 12B are a plan view and a front view showing the wipe unit 53, the cleaning liquid supply unit 55, and the recording head 37.

First, the maintenance unit 13 in the printing operation will be described. In the printing operation, the cap unit 51 and the wipe unit 53 are moved to the standby position. That is, as shown in FIG. 12A, the cleaning liquid supply member 73 included in the wipe unit 53 is moved to the replenishment position. More specifically, as shown in FIG. 10, the waste liquid tray cover 83 is lowered, and the pair of positioning pins 171 abut against the upper surface of the front end portion 101*b* of the cleaning liquid storage member 101 to position the cleaning liquid storage member 101 in a horizontal posture. Further, the pair of protrusions 153 push down the pair of arms 95a of the holder 95 of the carriage 71. As a result, the holder 95 is turned with respect to the moving body 91, and the blade 93 is inclined to the upstream side of the moving direction X1. Further, the replenishment pipes 141 supported by the waste liquid tray cover 83 are moved just above the replenishment ports 113 of the cleaning liquid storage member 101. As described above, the tip of the replenishment pipe 141 may be inserted into the replenishment port 113.

When the printing operation is started, the sheet is fed from the sheet feeding cassette 5 by the sheet feeding roller 7. The fed sheet is conveyed to the conveying unit 9 along the conveyance path 19 by the conveying rollers pair 21. The sheet is conveyed along the upper track of the conveying belt 25 of the conveying unit 9. At this time, the ink is ejected onto the sheet from the recording head 37 of the head unit 11 corresponding to the image data, and an image is formed on the sheet. Thereafter, the sheet is conveyed along the conveyance path 19 by the conveying rollers pair 21 and discharged to the discharge tray 17 by the discharge rollers pair 15.

Thus, the head unit 11 is separated from the cleaning liquid supply member 73 during the printing operation. Therefore, a defect such that the cleaning liquid accidentally comes into contact with the sheet does not occur.

After the printing operation is completed, the wiping operation is performed at a predetermined timing (description of the capping operation is omitted). As described above, the wipe unit 53 is moved to the standby position, and the cleaning liquid supply member 73 included in the wipe unit 53 is moved to the replenishment position.

First, the control part 201 controls the head unit lifting mechanism 41 to lift the head unit 11 to the retracted position.

Thereafter, the control part 201 controls the pump 145 to pump the cleaning liquid from the cleaning liquid tank 143 to the pipe 161. The cleaning liquid is sent through the pipe 161 to the three replenishment pipes 141. Then, it is supplied from the three replenishment pipes 141 to the hollow portion 111 through the replenishment ports 113 of the three cleaning liquid storage members 101 and then stored.

The control part 201 drives the pump 145 to pump the cleaning liquid until the cleaning liquid supplied to the hollow portion 111 is held in a state protruding in a hemispherical shape from the supply port 115, and then stops the driving the pump 145.

Thereafter, the control part 201 controls the waste liquid tray cover lifting mechanism 85 to lift the waste liquid tray cover 83.

Thereafter, as shown in FIG. 12B, the control part 201 controls the wipe unit moving mechanism 131 to move the wipe unit 53 (the carriage 71, the cleaning liquid supply member 73, and the waste liquid tray 75) from the standby position to the wiping position. At this time, the cleaning liquid supply member 73 included in the wipe unit 53 is moved to the supply position while the cleaning liquid protrudes in a hemispherical state from the supply port 115. Thereafter, the control part 201 controls the head unit lifting mechanism 41 to lower the head unit 11 to the cleaning position.

The head unit 11 is lowered until a height of the nozzle surface N of the recording head 37 is equal to a height of the lower surface of the front end portion 101b of the cleaning liquid storage member 101. Then, a gap between the lower surface of the front end portion 101b of the cleaning liquid storage member 101 and the nozzle surface N of the recording head 37 is closed by the sheet 119. As a result, the supply port 115 of the cleaning liquid storage member 101 is disposed between the blade 93 and the nozzle surface N.

Thereafter, the control part 201 controls the carriage moving mechanism 97 to move the carriage 71 from the moving start position to the moving end position. Thus, the blade 93 passes through the supply ports 115 of the cleaning liquid storage member 101, and moves along the sheet 119 to the nozzle surface N in a state of holding the cleaning liquid protruding from the supply ports 115. Then, the wiping operation is performed in which the blade 93 is moved along the nozzle surface N. By this wiping operation, the ink remaining on the nozzle surface N is wiped off by the blade 93 together with the cleaning liquid. The wiped ink and cleaning liquid fall from the lower edge and the side edges of the blade 93 to the waste liquid tray 75 below.

At this time, as shown in FIG. 8, since the width "a" of the blade 93 is narrower than the width "b" of the region where the supply ports 115 are formed, the cleaning liquid supplied from the supply ports 115 also goes around both the sides of the blade 93. Then, by the blade 93, the nozzle surface N can be surely wiped off using the cleaning liquid over the entire area in the blade width direction X2.

Thereafter, the control part 201 controls the head unit lifting mechanism 41 to lift the head unit 11 to the standby position. Thereafter, the control part 201 controls the carriage moving mechanism 97 to move the carriage 71 to the moving start position. Thereafter, the control part 201 controls the wipe unit moving mechanism 131 to move the wipe unit 53 from the wiping position to the standby position. Further, the control part 201 controls the waste liquid tray cover lifting mechanism 85 to lower the waste liquid tray cover 83.

Next, an example of the cleaning operation of the blade 93 will be described. The cleaning operation of the blade 93 is performed in a state where the wipe unit 53 is moved to the standby position, that is, the cleaning liquid supply member 73 is moved to the replenishment position. First, the control part 201 controls the carriage moving mechanism 97 to move the blade 93 below the supply ports 115. Thereafter, the control part 201 controls the pump 145 to pump the cleaning liquid into the pipe 161, and to replenish the cleaning liquid to the hollow portion 111 through the replenishment port 113 of the cleaning liquid storage member 101 through the pipe 161. The cleaning liquid falls from the hollow portion 111 through the supply ports 115 to the blade 93 below. The control part 201 controls the carriage moving mechanism 97 to reciprocate the blade 93 within a predetermined range. Thus, the blade 93 is cleaned.

In this case, since the cleaning liquid supplied from the supply port 115 goes around both the side surfaces and the rear surface of the blade 93, the ink or the like adhering to both the side surfaces and the rear surface of the blade 93 can be surely washed away.

As described above, according to the present disclosure, since the width of the region where the supply ports 115 of the cleaning liquid are formed is wider than the width of the blade 93, the cleaning liquid can be surely passed around both the side surfaces of the blade 93. Therefore, the nozzle surface N can be wiped off more surely by the blade 93 using the cleaning liquid. Further, when cleaning the blade 93, both the side surfaces of the blade 93 can be washed off with the cleaning liquid.

The wipe unit 53 is provided with the carriage 71 and the cleaning liquid supply member 73, and is moved to the separated position during the printing operation. That is, since the head unit 11 is separated from the cleaning liquid supply member 73 during the printing operation, the cleaning liquid does not adhere to the sheet or the sheet does not come into contact with the mechanism for supplying the cleaning liquid even when the sheet is erroneously bent upward during the printing operation. Therefore, contamination of the sheet by the cleaning liquid and damage to the mechanism for supplying the cleaning liquid by the sheet can be prevented.

Further, the replenishment pipes 141 of the cleaning liquid replenishment part 55 for supplying the cleaning liquid to the cleaning liquid storage member 101 are moved only in the upper-and-lower direction together with the waste liquid tray cover 83, but are not moved in the left-and-right direction. As described above, since the moving distance of the replenishment pipe 141 is relatively short, it is possible to prevent the pipe 161 connected to the replenishment pipes 141 from being bent and from causing a replenishment failure. Furthermore, the pipe 161 can be drawn in a narrow space.

In this embodiment, an example in which the four head units 11 are provided for the colors of the ink and the maintenance unit 13 is provided for each head unit 11 has been described. However, the four head units 11 may be integrally provided, and the maintenance unit 13 may be configured so that the four cap units 51 and the four wipe units 53 are integrally provided. Further, the cleaning liquid supply member 73 may be provided on the recording head 37.

Although the present disclosure has been described in particular embodiments, the present disclosure is not limited to the foregoing embodiments. A person skilled in the art may modify the above embodiments, so long as they do not deviate from the scope and object of the present disclosure.

The invention claimed is:

1. An inkjet recording apparatus comprising:

a head unit provided with a nozzle surface on which a plurality of ink ejection ports is opened downward, and supported to be lifted and lowered;

a blade which is in contact with the nozzle surface and moves in a predetermined moving direction to wipe off the nozzle surface;

a cleaning liquid supply member which stores a cleaning liquid replenished from a cleaning liquid source and supplies the cleaning liquid between a moving start position of the blade and the nozzle surface; and a wipe unit which includes the blade and is movable to a wiping position where the blade is in contact with the nozzle surface and a separated position where the blade is separated from the nozzle surface, wherein the cleaning liquid supply member is provided integrally with the wipe unit, when the wipe unit is moved to the wiping position, the cleaning liquid supply member is moved to a supply position between the moving start position of the blade and the nozzle face, and when the wiping unit is moved to the separated position, the cleaning liquid supply member is moved to a replenishment position where the cleaning liquid is replenished from the cleaning liquid source, the cleaning liquid supply member has a plurality of supply ports provided between the moving start position of the blade and the nozzle surface, and when a direction crossing the moving direction is defined as a width direction, a width of the blade is set to "a", and a width of a region where the supply ports are formed is set to "b", then the next formula is established, $a \leq b$.

2. The inkjet recording apparatus according to claim 1, wherein the outermost supply ports of the supply ports in the width direction are arranged on both outer sides of the blade in the width direction.

3. The inkjet recording apparatus according to claim 1, wherein when a width of the cleaning liquid supply member is set to "c", the next formula is established, $a \leq b < c$.

* * * * *